(12) United States Patent
Hsieh et al.

(10) Patent No.: US 9,519,312 B2
(45) Date of Patent: Dec. 13, 2016

(54) APPARATUS COMPRISING A VARIABLE NUMBER OF PARTS WHICH MAY BE PAIRED IN MULTIPLE CONFIGURATIONS TO FORM A USER INTERFACE

(75) Inventors: Yi-Ta Hsieh, Helsinki (FI); Alberto Casati, Monza (IT); Haleh Barmaki, Tehran (IR)

(73) Assignee: Nokia Technologies Oy, Espoo (FI)

( * ) Notice: Subject to any disclaimer, the term of this patent is extended or adjusted under 35 U.S.C. 154(b) by 142 days.

(21) Appl. No.: 13/251,651

(22) Filed: Oct. 3, 2011

(65) Prior Publication Data

US 2013/0082917 A1    Apr. 4, 2013

(51) Int. Cl.
    *G06F 1/16*    (2006.01)
    *G06F 3/14*    (2006.01)
    *G09G 5/14*    (2006.01)

(52) U.S. Cl.
    CPC ........... *G06F 1/1649* (2013.01); *G06F 1/1652* (2013.01); *G06F 1/1654* (2013.01); *G06F 3/1423* (2013.01); *G09G 5/14* (2013.01); *G09G 2354/00* (2013.01); *G09G 2370/22* (2013.01); *G09G 2380/14* (2013.01)

(58) Field of Classification Search
    CPC ..... G06F 1/1649; G06F 1/1652; G06F 1/1654
    USPC ......... 178/18.03; 345/1.1, 1.3, 76, 173, 156; 455/556.2, 566; 715/273, 862; 380/283
    See application file for complete search history.

(56) References Cited

U.S. PATENT DOCUMENTS

| 6,628,244 | B1 | 9/2003 | Hirosawa et al. |
| 2004/0044682 | A1 | 3/2004 | Nakamura et al. |
| 2006/0022910 | A1 | 2/2006 | Sekiya et al. |
| 2007/0195009 | A1* | 8/2007 | Yamamoto et al. ........... 345/1.1 |
| 2007/0283248 | A1* | 12/2007 | Yoshida ........................ 715/526 |
| 2009/0000830 | A1 | 1/2009 | Kim et al. |
| 2010/0079355 | A1* | 4/2010 | Kilpatrick et al. ............ 345/1.3 |
| 2012/0054822 | A1 | 3/2012 | Dvorak et al. |

OTHER PUBLICATIONS

International Search Report and Written Opinion for Application No. PCT/IB2012/055273, dated Apr. 8, 2013.
"Paper Phone"; Cell Phone Review Release Date 2011; Downloaded on Jan. 19, 2012 at http://wadeagnew.com/paper-phone/.
Extended European Search Report for corresponding European Application No. 12838616.6 dated Mar. 20, 2015, 6 pages.

* cited by examiner

*Primary Examiner* — Larry Sternbane
*Assistant Examiner* — Sepehr Azari
(74) *Attorney, Agent, or Firm* — Alston & Bird LLP

(57) ABSTRACT

An apparatus comprising: a controller; a first part; a second part; an arrangement configured to add a third part between the first part and the second part to change a configuration of the apparatus from a first configuration in which the first part and the second part are adjacent and there is no third part between the first part and the second part, to a second configuration in which the first part and the second part are separated by the third part and the first part and the third part are adjacent, wherein the controller is configured to pair the first part and the second part as a user interface when the apparatus is in the first configuration, and is configured to pair the first part and the third part as a user interface when the apparatus is in the second configuration.

20 Claims, 3 Drawing Sheets

APPARATUS COMPRISING A VARIABLE NUMBER OF PARTS WHICH MAY BE PAIRED IN MULTIPLE CONFIGURATIONS TO FORM A USER INTERFACE

TECHNOLOGICAL FIELD

Embodiments of the present invention relate to an apparatus configured to have multiple user interfaces and method.

BACKGROUND

Electronic apparatus often have a user interface which allows a user to interact with the apparatus by receiving output from the user interface and/or by providing input to the user interface.

BRIEF SUMMARY

It may be desirable for a user or manufacturer to augment or modify a user interface.

According to various, but not necessarily all, embodiments of the invention there is provided an apparatus comprising: a controller; a first part; a second part; an arrangement configured to add a third part between the first part and the second part to change a configuration of the apparatus from a first configuration in which the first part and the second part are adjacent and there is no third part between the first part and the second part, to a second configuration in which the first part and the second part are separated by the third part and the first part and the third part are adjacent, wherein the controller is configured to pair the first part and the second part as a user interface when the apparatus is in the first configuration, and is configured to pair the first part and the third part as a user interface when the apparatus is in the second configuration.

According to various, but not necessarily all, embodiments of the invention there is provided a method comprising: detecting that a first part and a second part are adjacent and pairing the first part and the second part as a user interface; and subsequently detecting that the first part and a third part are adjacent, and pairing the first part and the third part as a user interface.

According to various, but not necessarily all, embodiments of the invention there is provided an apparatus comprising: at least one processor; and at least one memory including computer program code the at least one memory and the computer program code configured to, with the at least one processor, cause the apparatus at least to perform: detecting that a first part and a second part are adjacent and pairing the first part and the second part as a user interface; and subsequently detecting that the first part and a third part are adjacent, and pairing the first part and the third part as a user interface.

BRIEF DESCRIPTION

For a better understanding of various examples of embodiments of the present invention reference will now be made by way of example only to the accompanying drawings in which.

Figure 4:
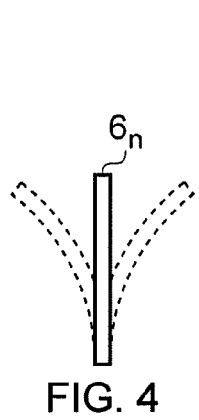
Figure 5:
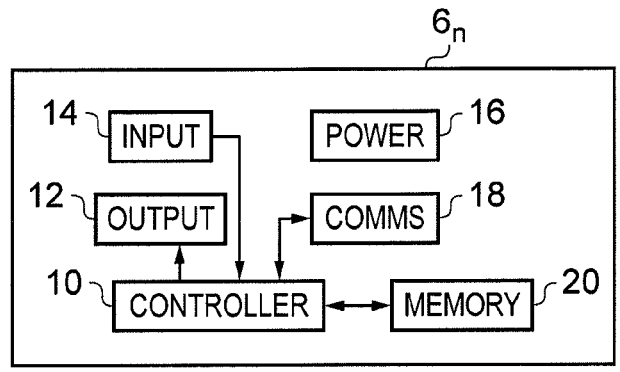
Figure 6A:
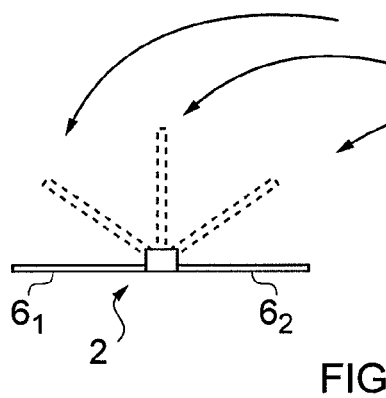
Figure 6B:
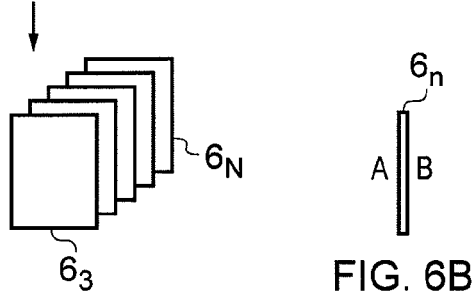
Figure 7:
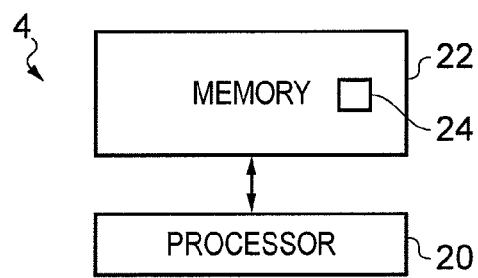
Figure 8:
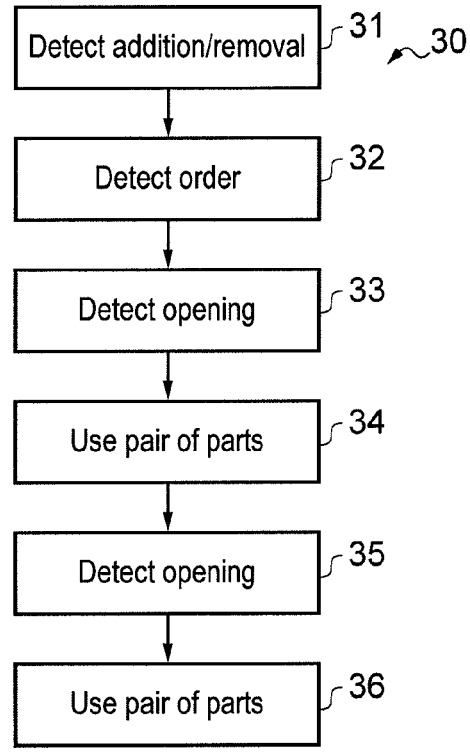
Figure 9A:
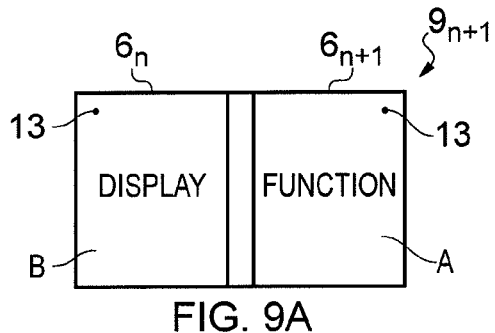
Figure 9B:
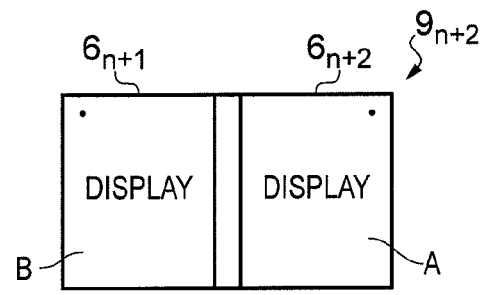
Figure 9C:
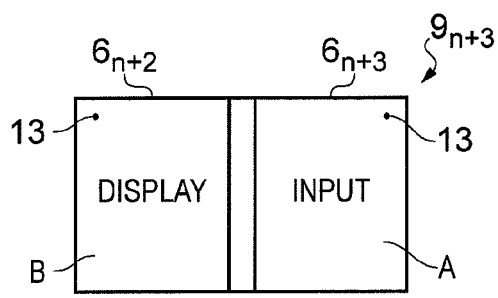
Figure 10A:
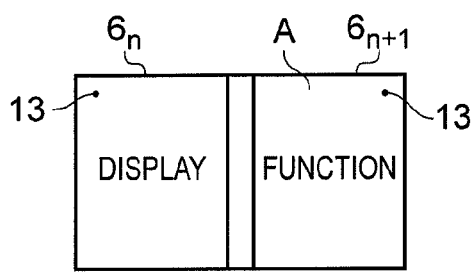
Figure 10B:
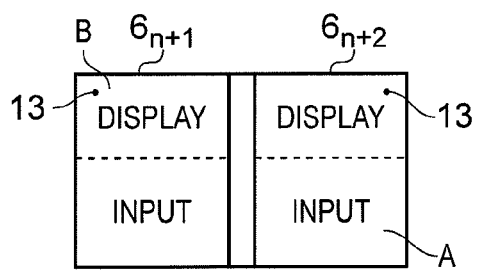
Figure 10C:
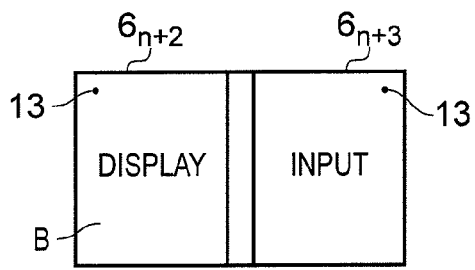

FIG. 4 schematically illustrates an example of a part such as the third part;

FIG. 5 schematically illustrates one example of an additional part such as a third part;

FIG. 6A illustrates an example where the apparatus may be augmented by adding a plurality of additional parts;

FIG. 6B illustrates that each additional part in a set of additional parts has two faces (pages);

FIG. 7 illustrates an example of a controller;

FIG. 8 illustrates an example of a method;

FIGS. 9A, 9B and 9C illustrate a sequence generated by turning an additional part over from a position on the right with front face up to a position on the left with front face down; and FIGS. 10A, 10B and 10C illustrate a sequence generated by turning an additional part from a position on the right with front face up to a position on the left with front face down.

DETAILED DESCRIPTION

The Figures illustrate an apparatus 2 comprising: a controller 6; a first part $6_1$; a second part $6_2$; an arrangement 8 configured to add a third part $6_3$ between the first part $6_1$ and the second part $6_2$ to change a configuration of the apparatus 2 from a first configuration in which the first part $6_1$ and the second part $6_2$ are adjacent and there is no third part $6_3$ between the first part $6_1$ and the second part $6_2$, to a second configuration in which the first part $6_1$ and the second part $6_2$ are separated by the third part $6_3$ and the first part $6_1$ and the third part $6_3$ are adjacent, wherein the controller 4 is configured to pair the first part $6_1$ and the second part $6_2$ as a user interface $9_1$ when the apparatus 2 is in the first configuration, and is configured to pair the first part $6_1$ and the third part $6_3$ as a user interface $9_2$ when the apparatus 2 is in the second configuration.

Figure 1:
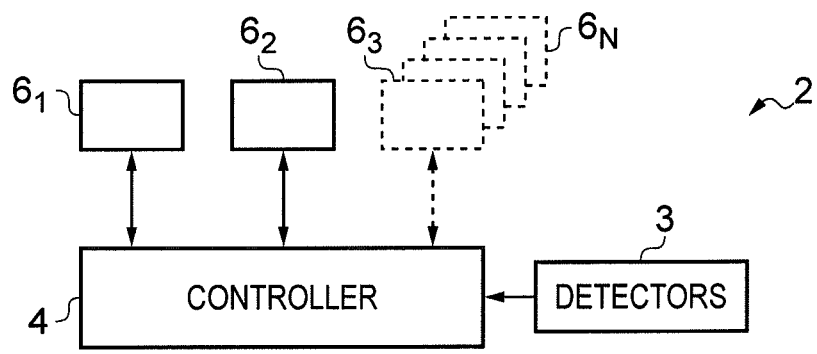
FIG. 1 illustrates an apparatus comprising a controller, a first part, a second part and an arrangement configured to add a third part between the first part and the second part.

In more detail, FIG. 1 illustrates an apparatus 2 comprising a controller 4, a first part $6_1$, a second part $6_2$ and an arrangement 8 configured to add a third part $6_3$ between the first part $6_1$ and the second part $6_2$ to change a configuration of the apparatus 2.

Figure 2A:
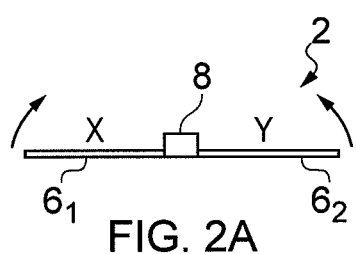
FIG. 2A illustrates, in side view, a first configuration of the apparatus in which the first part and the second part are adjacent.
Figure 2B:
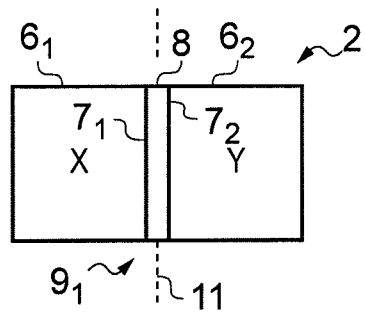
FIG. 2B illustrates, in plan view, the first configuration of the apparatus in which the first part and the second part are adjacent.

FIGS. 2A and 2B illustrate, in side view and plan view, a first configuration of the apparatus 2. In the first configuration the first part $6_1$ and the second part $6_2$ are adjacent. There is no third part $6_3$ between the first part $6_1$ and the second part $6_2$.

The controller 4 is configured to pair the first part $6_1$ and the second part $6_2$ as a user interface $9_1$ when the apparatus 2 is in the first configuration with the first part $6_1$ and the second part $6_2$ positioned side by side as illustrated in FIG. 2B.

The first part $6_1$ and the second part $6_2$ rotate relative to each other about a common axis 11 similar to the pages of a book. In this example, the common axis passes through the arrangement 8. An inner edge $7_1$ of the first part $6_1$ at the arrangement 8 and an inner edge $7_2$ of the second part $6_2$ at the arrangement 8 are parallel to each other and the axis 11 about which the first part $6_1$ and the second part $6_2$ rotate relative to each other.

Like a book, the apparatus 2 may be opened and closed. An example of the apparatus 2, when open, is illustrated in FIG. 2A and FIG. 2B. The first part $6_1$ and the second part $6_1$ are substantially parallel, they do not overlap but are side by side separated by the arrangement 8. When the apparatus 2 is closed the first part $6_1$ and the second part $6_2$ are substantially parallel, they overlap and they are not separated by the arrangement 8.

The arrangement 8 is configured to enable a third part $6_3$ to be added to the apparatus 2 between the first part $6_1$ and the second part $6_2$. The addition of the third part $6_3$ changes the configuration of the apparatus 2 from the first configuration to a second configuration. In the second configuration the first part $6_1$ and the second part $6_2$ are separated by the third part $6_3$.

The first part $6_1$, the third part $6_3$ and the second part $6_2$ rotate relative to each other about the common axis 11 similar to the pages of a book. In this example, the common axis passes through the arrangement 8. An inner edge $7_1$ of the first part $6_1$ at the arrangement 8, an inner edge $7_3$ of the third part $6_3$ at the arrangement 8, and an inner edge $7_2$ of the second part $6_2$ at the arrangement 8 are parallel to each other and the axis 11 about which the first part $6_1$, the third part $6_3$ and the second part $6_2$ rotate relative to each other.

Figure 3A:
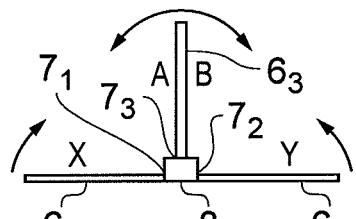
FIG. 3A illustrates, in side view, a second configuration of the apparatus in which the first part and the second part are separated by the third part.

Like a book, the apparatus 2 may be opened and closed. An example of the apparatus 2, when fully open, is illustrated in FIG. 3A (and FIG. 3D) and FIG. 3C (and FIG. 3E). In this example, the first part $6_1$ and the second part $6_1$ are substantially parallel, they do not overlap and they are separated by the arrangement 8. When the apparatus 2 is closed the first part $6_1$, the third part $6_3$ and the second part $6_2$ are substantially parallel, they overlap and they are not separated by the arrangement 8.

Referring to FIG. 3A, it can be observed that the first part $6_1$ provides at least a face (page) X, the second part $6_2$ provides at least a face (page) Y and the third part $6_3$ provides two opposing faces (pages) A, B.

Figure 3B:
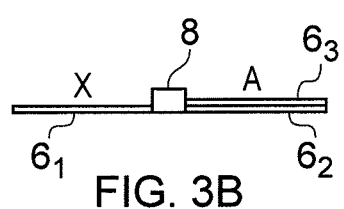
FIG. 3B illustrates, in side view, a second configuration of the apparatus in which the first part and the second part are separated by the third part and the first part and the third part are side by side.

FIG. 3B illustrates a first overlapping arrangement in which the third part $6_3$ overlaps the second part $6_2$ but not the first part $6_1$. As illustrated in FIG. 3D the face (page) X of the first part $6_1$ and the front face (page) A of the third part $6_3$ are arranged side by side. The controller 4 is configured to pair the face (page) X of the first part $6_1$ and the front face (page) A of the third part $6_3$ as a user interface $9_2$. The controller 4 may, for example, be configured to coordinate simultaneous use of the first part $6_1$ and the third part $6_3$ to provide output to a user and/or enable input from a user.

Figure 3C:
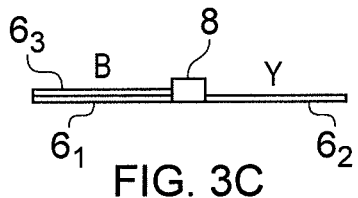
FIG. 3C illustrates, in side view, a second configuration of the apparatus in which the first part and the second part are separated by the third part and the third part and the second part are side by side.
Figure 3D:
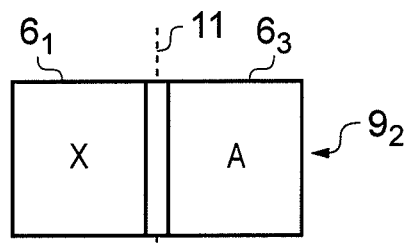
FIG. 3D illustrates, in plan view, a second configuration of the apparatus in which the first part and the second part are separated by the third part and the first part and the third part are side by side.
Figure 3E:
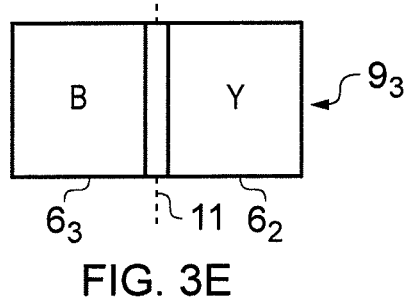
FIG. 3E illustrates, in plan view, a second configuration of the apparatus in which the first part and the second part are separated by the third part and the third part and the second part are side by side.

FIG. 3C illustrates a second overlapping arrangement in which the third part $6_3$ overlaps the first part $6_1$ but not the second part $6_2$. As illustrated in FIG. 3E the face (page) Y of the second part $6_2$ and the back face (page) B of the third part $6_3$ are arranged side by side. The controller 4 is configured to pair the face (page) B of the third part $6_3$ and the page Y of the second part $6_2$ as a user interface $9_2$. The controller 4 may, for example, be configured to coordinate simultaneous use of the second part $6_2$ and the third part $6_3$ to provide output to a user and/or enable input from a user.

It will therefore be appreciated that the functionality of the apparatus 2 may be modified by adding and/or removing parts such as the third part $6_3$. Adding or removing parts, such as the third part $6_3$, results in the controller 4 automatically creating new pairings of parts to produce new user interfaces. Thus, in the example above, by adding the third part $6_3$ the functionality of the apparatus expands from having a single user interface $9_1$ comprised of pages X, Y to having two distinct user interfaces $9_1$, $9_1$ comprised respectively of pages X, A and B, Y.

By adding or removing parts such as the third part $6_3$ new user interfaces are formed. The new user interfaces are formed from a page from one part and a page from another part. A new user interface may, for example, have different hardware (e.g. a different arrangement of user input devices and user output devices) and/or it may have different software functionality (e.g. a different use for the same or similar user input or output devices).

For example, each of the first part $6_1$, second part $6_2$ and third part $6_3$ may comprises at least an input device and/or an output device. The page A of the third part $6_3$ may provide an input device and/or an output device to be used in combination with an input device and/or output device of the page X of the first part $6_1$. The page B of the third part $6_3$ may provide an input device and/or an output device to be used in combination with an input device and/or output device of the page Y of the second part $6_2$.

The apparatus 2 may also comprise one or more detectors 3 that detect or discriminate the configuration of the apparatus 2 and which faces (pages) of which parts are presented side by side to a user. This information is used by the controller 4 to enable a particular user interface using the pages of the parts that are presented to a user.

FIG. 4 schematically illustrates an example of a part such as a third part $6_3$. The first part $6_1$ and the second part $6_2$ may also be the same or similar to the illustrated example.

In the illustrated example, the third part $6_3$ is flexible. When it is removably engaged by the arrangement 8 at the edge $7_3$, the remainder of the third part $6_3$ is configured to flex. The third part $6_3$ may, for example, be formed from flexible components such as flexible printing wiring boards and flexible displays. The third part $6_3$ may, for example, be formed from electronic paper.

FIG. 5 schematically illustrates one example of a part such as a third part $6_3$.

The figure schematically illustrates at least some of the components of the part.

In this example, the third part $6_3$ comprises a controller 10 for controlling at least some of the operation of the third part $6_3$ and a communications interface 18 for communicating with the apparatus 2 when the third part $6_3$ is retained by the arrangement 8 of the apparatus 2.

The communications interface 18 typically establishes a communication channel between the controller 10 of the third part $6_3$ and the controller 4 of the apparatus 2. The communications interface 18 may be a contact interface or a wireless interface such as, for example, a Bluetooth® interface.

The third part $6_3$ may also comprises a power supply 16 for powering the third part $6_3$ when the third part $6_3$ is decoupled from the apparatus 2. This enables the third part $6_3$ to be used not only as an integral part of the apparatus 2 when it is coupled to the apparatus 2 by the arrangement 8 but also enables third part $6_3$ to be used as a standalone apparatus separate from the apparatus 2. The power supply 16 may, for example, be a rechargeable power supply that is recharged when the third part $6_3$ is coupled to the apparatus 2 by the arrangement 8. The recharging may occur via a direct connection or contactlessly, for example, using inductive charging.

The third part $6_3$ may also comprise one or more input devices 14 and/or one or more input devices 12. Such devices may be associated with one or other of faces (pages) of the third part $6_3$.

The third part $6_3$ may also comprise a memory 20 that stores machine readable instructions. When the third part $6_3$ is coupled to the apparatus by the arrangement 8, the communications interface 18 may be used to provide the machine readable instructions from the third part $6_3$ to the controller 4 of the apparatus 2. In some examples, the controller 4 of the apparatus 2 may use the received machine readable instructions to enable a user interface that includes a face (page) of the third part $6_3$. This is particularly useful if a particular face (page) or the faces (pages) of the third part $6_3$ are to provide a particular dedicated function or functions.

Although the apparatus 2 has previously been described with reference to a first part $6_1$, a second part $6_2$ and a third part $6_3$, it should be appreciated that that was a simple example and that more complexity may be introduced. For example multiple parts such as the third part $6_3$ may be added or removed at different positions relative to the first part $6_1$ and second part $6_2$. The detectors 3 detect the addition/removal of parts and which pages of which parts are presented to a user and the controller 4 uses those presented pages to provide a user interface.

FIG. 6A illustrates an example where the apparatus 2 comprising the first part $6_1$ and the second part $6_2$ may be augmented by adding a plurality of additional parts $6_n$ (where n=3, 4 . . . N) to the apparatus 2 using the arrangement 8. The additional parts $6_n$ may, depending on implementation be added before the first part $6_1$ and/or between the first part $6_1$ and the second part $6_2$ and/or after the second part $6_2$ The arrangement 8 is configured to add the additional parts $6_n$ and change the configuration of the apparatus 2.

It may also be possible to remove parts, for example, some or all of those parts $6_n$ that have been added.

The controller 4 is configured to pair adjacent parts, when presented side-by-side, as a user interface 9.

The first part $6_1$ and the second part $6_2$ may also be additional parts that are removable.

FIG. 6B illustrates that each additional part $6_n$ in the set $\{6_n; n=3, 4 \ldots N\}$ of additional parts has two faces (pages) A, B as previously described. Depending upon how the apparatus 2 has been opened and the position of an additional part $6_n$, the additional part $6_n$ may be presented to a user or not presented to a user. If the additional part $6_n$ is presented to a user, then depending upon the orientation of the additional part $6_n$, either the front face (page) A or the rear face (page) B will be presented to a user (see FIGS. 3B, 3D and 3C, 3E). The controller 4 uses the presented face (page) as part of a user interface in combination with the adjacent presented face (page) of the adjacent part.

In some but not necessarily all embodiments, each of the additional parts $6_n$ has the same functionality on a particular one of its faces (pages) A, B.

FIGS. 9A, 9B and 9C illustrate a sequence generated by turning the additional parts $6_{n+2}$ from a position on the right with its front face (page) A upwards similar to that illustrated in FIG. 3B to a position on the left with its front face (page) A downwards similar to that illustrated in FIG. 3C.

In FIG. 9A, the additional part $6_n$ is positioned to the left and it is presenting its rear face (page) B and the additional part $6_{n+1}$ is positioned to the right and it is presenting its front face (page) A. The rear face (page) B of the additional part $6_n$ and the front face (page) A of the additional part $6_{n+1}$ are simultaneously presented side by side. The controller 4 automatically controls rear face (page) B of the additional part $6_n$ and the front face (page) A of the additional part $6_{n+1}$ to provide a user interface $9_{n+1}$.

In FIG. 9B, the additional parts $6_{n+1}$ has been rotated so that it now overlies the additional part $6_n$ on the left. The additional parts $6_{n+1}$ is presenting its rear face (page) B and the additional part $6_{n+2}$ is positioned to the right and it is presenting its front face (page) A. The rear face (page) B of the additional part $6_{n+1}$ and the front face (page) A of the additional part $6_{n+2}$ are simultaneously presented side by side. The controller 4 automatically controls the rear face (page) B of the additional part $6_{n+1}$ and the front face (page) A of the additional part $6_{n+2}$ to provide a user interface $9_{n+2}$.

In FIG. 9C, the additional parts $6_{n+2}$ has been rotated so that it now overlies the additional part $6_{n+1}$ on the left. The additional parts $6_{n+2}$ is presenting its rear face (page) B and the additional part $6_{n+3}$ is positioned to the right and it is presenting its front face (page) A. The rear face (page) B of the additional part $6_{n+2}$ and the front face (page) A of the additional part $6_{n+3}$ are simultaneously presented side by side. The controller 4 automatically controls the rear face (page) B of the additional part $6_{n+2}$ and the front face (page) A of the additional part $6_{n+3}$ to provide a user interface $9_{n+3}$.

It should be appreciated that each of the rear faces (pages) B of the additional parts provide the same common (generic) functionality. In this example, the common functionality is a display but other examples are possible. This allows any of the additional parts to be positioned adjacent any other additional part as each additional part provides on its rear face (page) B the common functionality necessary to complete a user interface.

It should be appreciated that in this example each front face (page) A of the additional parts provides a part-specific (dedicated) functionality. This part-specific functionality when paired by the controller 4 with the common functionality of its adjacent part creates a specific user interface.

FIGS. 10A, 10B and 10C are equivalent to FIGS. 9A, 9B and 9C. However, in this example, each of the rear faces (pages) B of the additional parts do not necessarily provide the same common functionality. In this example, the rear face (page) B of the additional part $6_{n+1}$ comprises functionality that should be paired with only the front face (page) A of the additional part $6_{n+2}$ to create a particular user interface $6_{n+2}$. Consequentially it is important that the additional part $6_{n+1}$ and the additional part $6_{n+2}$ are added in the correct order with additional part $6_{n+1}$ preceding the additional part $6_{n+2}$.

In the example of FIG. 10B, the rear face (page) B of the additional part $6_{n+1}$ comprises mixed functionality that is paired with mixed functionality of the front face (page) A of the additional part $6_{n+2}$. In this example, the rear face (page) B of the additional part $6_{n+1}$ comprises display functionality in an upper portion and user input functionality in a lower portion and the front face (page) A of the additional part $6_{n+2}$ comprises corresponding display functionality in an upper portion and corresponding user input functionality in a lower portion. When the rear face (page) B of the additional part $6_{n+1}$ and the front face (page) A of the additional part $6_n+_2$ are paired the corresponding display functionality (e.g. displays) and the corresponding input functionality (e.g. keypads) are aligned.

In some embodiments in order to provide a sense of continuity of use between the different parts whether additional parts or not, each of the parts comprises a user input device 13 that provides a common (generic) function at a common position. For example, an on/off button or a help button or similar may be consistently presented at the top right of the front faces (pages) A and the top left of back faces (pages) B so that the device is consistently at an upper, outer extremity of the apparatus 2.

FIG. 8 illustrates an example of one type of method that may be performed by the controller 4 of the apparatus 2. The method 30 comprises: detecting that a first part and a second part are adjacent and pairing the first part and the second part as a user interface. This has been described previously, for example, with reference to FIGS. 2A and 2B. Then, subsequently, the method comprises detecting that the first part and a third part are adjacent, and pairing the first part and the third part as a user interface. This has been described previously, for example, with reference to FIGS. 3B and 3D and 3C and 3E.

In more detail, the method 30 starts at block 31 by detecting an addition or removal of an additional part $6_n$.

Then at block 32 the new order of the parts is detected.

Then at block 33 an opening of the apparatus is detected, for example, by detecting which faces of which parts are presently presented side-by-side It may be possible to combine blocks 31, 32, 33 into a single block by for example using proximity detectors 3 on the parts. Each part may have a proximity transmitter associated with a front face (page) A that transmits an identifier of the part and each part may have a proximity receiver associated with a rear face (page) B. In use, the proximity transmitter associated with a front face (page) A of a part transmits an identifier of the part to the preceding adjacent part only. In use, the proximity receiver associated with the rear face (page) B of a part receives an identifier of the following adjacent part only. Each part can therefore identify to the controller 4 which part it is adjacent to at a particular time. This enables the order of the parts to be determined and it also enables where the apparatus is open to be determined.

It is of course possible to have, in addition or in the alternative, a proximity transmitter associated with a back face (page) B that transmits an identifier of the part and a proximity receiver associated with a front face (page) A.

The use of proximity detectors allows the controller 4 to determine how the parts are opened and therefore how they are divided into two stacks and which parts are at the top of the stacks and therefore have their faces presented side-by-side.

At block 34, the controller 4 having determined which faces of which parts are presented side-by-side is then able to communicate with those pair of parts to provide a user interface.

At block 35, a new opening of the apparatus 2 is detected.

At block 36, the controller 4 having determined which faces of which parts are now presented side-by-side is then able to communicate with those pair of parts to provide a new user interface.

Referring to FIG. 7, the controller 4 (and/or the controller 10) may be implemented using instructions that enable hardware functionality, for example, by using executable computer program instructions in a general-purpose or special-purpose processor that may be stored on a computer readable storage medium (disk, memory etc) to be executed by such a processor.

The processor 20 is configured to read from and write to a memory 22. The processor 20 may also comprise an output interface via which data and/or commands are output by the processor 20 and an input interface via which data and/or commands are input to the processor 20.

The memory 22 stores a computer program 24 comprising computer program instructions that control the operation of the apparatus 2 when loaded into the processor 20. The computer program instructions 24 provide the logic and routines that enables the apparatus to perform the methods illustrated in FIG. 8, for example. The processor 20 by reading the memory 22 is able to load and execute the computer program 24.

The apparatus 2 may therefore comprise: at least one processor 20; and at least one memory 22 including computer program code 24 the at least one memory 22 and the computer program code 24 configured to, with the at least one processor 20, cause the apparatus at least to perform: detecting that a first part and a second part are adjacent and pairing the first part and the second part as a user interface; and subsequently detecting that the first part and a third part are adjacent, and pairing the first part and the third part as a user interface.

The computer program may arrive at the apparatus 2 via any suitable delivery mechanism. The delivery mechanism may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 24. The delivery mechanism may be a signal configured to reliably transfer the computer program 24. The apparatus 2 may propagate or transmit the computer program 24 as a computer data signal.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:
(a) hardware-only circuit implementations (such as implementations in only analog and/or digital circuitry) and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device."

As used here 'module' refers to a unit or apparatus that excludes certain parts/components that would be added by an end manufacturer or a user. The first part, the second part and the additional parts such as the third part may be modules.

The blocks illustrated in the FIG. 8 may represent steps in a method and/or sections of code in the computer program 24. The illustration of a particular order to the blocks does not necessarily imply that there is a required or preferred order for the blocks and the order and arrangement of the block may be varied. Furthermore, it may be possible for some blocks to be omitted.

Although embodiments of the present invention have been described in the preceding paragraphs with reference to various examples, it should be appreciated that modifications to the examples given can be made without departing from the scope of the invention as claimed.

For example, the first part $6_1$ may have two faces, for example as described with reference to the third part $6_3$ and the additional parts $6_n$.

For example, the second part $6_2$ may have two faces, for example as described with reference to the third part $6_3$ and the additional parts $6_n$.

For example, the first part $6_1$ may form an exterior part of the apparatus 2.

For example, the second part $6_2$ may form an exterior part of the apparatus 2.

When the first part $6_1$ has two faces and is an exterior part of the apparatus 2, a front face (page) A of the first part $6_1$ is on the exterior of the apparatus 2 and a back face (page) B of the first part $6_1$ acts as the face (page) X of the first part $6_1$.

When the second part $6_2$ has two faces and is an exterior part of the apparatus 2, a rear face (page) B of the second part $6_2$ is on the exterior of the apparatus 2 and a front face (page) A of the second part $6_2$ acts as the face (page) Y of the second part $6_2$.

The controller may, for example, be configured pair the exterior front face (page) A of the first part $6_1$ and the exterior rear face (page) B of the second part $6_2$ as a user interface.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An apparatus comprising:
a controller;
a first part comprising at least a first proximity sensor;
a second part comprising at least a second proximity sensor;
a third part comprising at least a third proximity sensor on one face of the third part and a fourth proximity sensor on an opposing face of the third part;
an arrangement configured to add the third part between the first part on a first stack and the second part on a second stack to change a configuration of the apparatus between a first configuration in which the first part and the second part are adjacent and exposed side-by-side on top of the different first and second stacks and there is no third part between the first part and the second part, and a second configuration in which the first part and the second part are separated by the third part, the first and second parts are no longer adjacent, and the third part is adjacent to the first part and is adjacent to the second part,
wherein the controller is configured to pair the first part and the second part, not the third part, as a user interface when the apparatus is in the first configuration, and is configured to pair the first part and the third part, not the second part, as a user interface when the apparatus is in the second configuration and the first part and the third part are exposed side-by-side on top of the different first and second stacks, and is configured to pair the second part and the third part, not the first part, as a user interface when the apparatus is in the second configuration and the second part and the third part are exposed side-by-side on top of the different first and second stacks,
wherein the apparatus is configured to identify whether the apparatus is in the first configuration or the second configuration and whether the first part and the third part are exposed side-by-side on top of the respective first stack and second stack or whether the second part and the third part are exposed side-by-side on top of the respective second stack and first stack
by detecting communication between the first proximity sensor and the third proximity sensor but not between the fourth proximity sensor and the second proximity sensor to determine that the third part and the second part are exposed side-by-side on top of the respective first and second stacks, and
by detecting communication between the second proximity sensor and the fourth proximity sensor but not between the third sensor and the first sensor to determine that the first part and the third part are exposed side-by-side on top of the respective first and second stacks.

2. An apparatus as claimed in claim 1, wherein the controller is configured to pair the first part and the third part as a user interface when the apparatus is in the second configuration and the first part and the third part are arranged side by side, and is configured to pair the third part and the second part as a different user interface when the third part and the second part are arranged side by side.

3. An apparatus as claimed in claim 1, wherein the first part and the second part are configured to move relative to one another between an overlapping arrangement and a non-overlapping arrangement.

4. An apparatus as claimed in claim 3, wherein the arrangement is configured to enable the third part to move relative to the first part and the second part, between a first overlapping arrangement in which the third part overlaps the second part but not the first part and a second overlapping arrangement in which the third part overlaps the first part but not the second part.

5. An apparatus as claimed in claim 3, wherein the first part has a face defined by edges and second part has a face defined by edges and wherein an edge of the first part and an edge of the second part are parallel to each other and parallel to an axis about which the first part and the second part rotate relative to each other.

6. An apparatus as claimed in claim 1, wherein the arrangement is configured to support a third part having a face defined by edges wherein an edge of the third part is parallel to an edge of the first part and an edge of the second part and parallel to the axis about which the first part, the second part and the third part rotate relative to each other.

7. An apparatus as claimed in claim 6, configured as a configurable book, wherein the first part provides at least a page, the second part provides at least a page and the third part provides two opposing pages.

8. An apparatus as claimed in claim 1 wherein the arrangement is configured to support a third part comprising two faces, including a first face adjacent the first part and a second face adjacent the second part, wherein the first face provides an input device and/or an output device to be used in combination with an input device and/or output device of the first part and the second face provides an input device and/or an output device to be used in combination with an input device and/or output device of the second part.

9. An apparatus as claimed in claim 1 comprising the third part.

10. An apparatus as claimed in claim 9, wherein the third part is flexible.

11. An apparatus as claimed in claim 9 wherein the third part is removable/replaceable.

12. An apparatus as claimed in claim 9, wherein the third part comprises a power supply.

13. An apparatus as claimed in claim 9, wherein the third part comprises a communications interface for communicating to the controller.

14. An apparatus as claimed in claim 9, wherein the third part provides a dedicated function and wherein a first face is configured for a generic function and a second face is configured for the dedicated function.

15. An apparatus as claimed in claim 9, wherein the third part provides a dedicated function and is configured to provide machine readable instructions to the controller relating to the dedicated function.

16. An apparatus as claimed in claim 9, wherein the arrangement is configured to add a further part between the first part and the third part to change a configuration of the apparatus to a further configuration wherein the controller is configured to pair the first part and the fourth part as a user interface when the apparatus is in the further configuration and the first part and the fourth part are arranged side by side, to pair the fourth part and the third part as a user interface when the apparatus is in the further configuration and the fourth part and the third part are arranged side by side to pair the third part and the second part as a user interface when the apparatus is in the further configuration and the third part and the second part are arranged side by side.

17. An apparatus as claimed in claim 1, wherein communication between proximity sensors comprises a proximity sensor for one of the parts transmitting an identity of said one part to be received by a proximity sensor on only another one of the parts that is adjacent to the said one part in the same stack.

18. A method comprising:
pairing a first part comprising a first proximity sensor and a third part but not a second part as a user interface if communication is detected between a second proximity sensor of the second part and a fourth proximity sensor of the third part and no communication is detected between the first proximity sensor of the first part and a third proximity sensor of the third part and it is determined that the first part and the third part are adjacent and exposed side-by-side on top of a respective first stack and a second stack;
pairing the second part and the third part but not the first part as a user interface if communication is detected between the first proximity sensor of the first part and the third proximity sensor of the third part and no communication is detected between the second proximity sensor of the second part and the fourth proximity sensor of the third part and it is determined that the first part and the third part are adjacent and exposed side-by-side on top of the respective first stack and second stack; and
pairing the first part and the second part as a user interface if no communication is detected between the first proximity sensor of the first part and the third proximity sensor of the third part and if no communication is detected between the second proximity sensor of the second part and the fourth proximity sensor of the third part and it is determined that the first part and second part are adjacent and exposed side-by-side on top of the respective first stack and second stack.

19. An apparatus comprising: at least one processor; and at least one memory including computer program code the at least one memory and the computer program code configured to, with the at least one processor, cause the apparatus at least to perform: pairing a first part and a third part but not a second part as a user interface if communication is detected between a second proximity sensor of the second part and a fourth proximity sensor of the third part and no communication is detected between a first proximity sensor of the first part and a third proximity sensor of the third part and it is determined that the first part and the third part are adjacent and exposed side-by-side on top of a respective first stack and a second stack; pairing the second part and the third part but not the first part as a user interface if communication is detected between the first proximity sensor of the first part and the third proximity sensor of the third part and no communication is detected between the second proximity sensor of the second part and the fourth proximity sensor of the third part and it is determined that the first part and the third part are adjacent and exposed side-by-side on top of the respective first stack and second stack; and
pairing the first part and the second part as a user interface if no communication is detected between the first proximity sensor of the first part and the third proximity sensor of the third part and if no communication is detected between the second proximity sensor of the second part and the fourth proximity sensor of the third part and it is determined that the first part and second part are adjacent and exposed side-by-side on top of the respective first stack and second stack.

20. An apparatus comprising: a controller; a first part comprising at least a first proximity sensor; a second part comprising at least a second proximity sensor; a third part comprising at least a third proximity sensor and a fourth proximity sensor; and an arrangement configured to add the third part between the first part on a first stack and the second part on a second stack to change a configuration of the apparatus between a first configuration in which the first part and the second part are adjacent and exposed side-by-side on top of the different first and second stacks and there is no third part between the first part and the second part, to a second configuration in which the first part and the second part are separated by the third part, the first and second parts are no longer adjacent, and the third part is adjacent to the first part and the second part, wherein the controller is configured to pair the first part and the second part, not the third part, as a user interface when the apparatus is in the first configuration, and is configured to pair the first part and the third part, not the second part, as a user interface when the apparatus is in the second configuration and the first part and the third part are exposed side-by-side on top of the different first and second stacks, and is configured to pair the second part and the third part, not the first part, as a user interface when the apparatus is in the second configuration and the second part and the third part are exposed side-by-side on top of the different first and second stacks, wherein each third part comprises:

a front face and a rear face;

and wherein the third proximity sensor and/or the fourth proximity sensor are provided by at least one proximity transmitter associated with at least one of the front face and the rear facet and at least one proximity receiver associated with at least one of the front face and the rear face;

wherein at least one proximity transmitter associated with at least one of the faces is configured to transmit an identifier of the third part to a proximity sensor on an adjacent part only to identify the third part to the adjacent part;

wherein at least one proximity receiver associated with at least one of the faces is configured to receive an identifier of an adjacent part in the same stack only to identify the adjacent part to the third part.

* * * * *

UNITED STATES PATENT AND TRADEMARK OFFICE
CERTIFICATE OF CORRECTION

| | |
|---|---|
| PATENT NO. | : 9,519,312 B2 |
| APPLICATION NO. | : 13/251651 |
| DATED | : December 13, 2016 |
| INVENTOR(S) | : Hsieh et al. |

It is certified that error appears in the above-identified patent and that said Letters Patent is hereby corrected as shown below:

In the Claims

<u>Column 14,</u>
Line 15, delete "rear facet" and insert --rear face--.

Signed and Sealed this
Tenth Day of October, 2017

Joseph Matal
*Performing the Functions and Duties of the*
*Under Secretary of Commerce for Intellectual Property and*
*Director of the United States Patent and Trademark Office*